(12) United States Patent
Duffin et al.

(10) Patent No.: US 9,595,300 B2
(45) Date of Patent: Mar. 14, 2017

(54) CONTEXTUAL CHAPTER NAVIGATION

(75) Inventors: Todd E. Duffin, Bellevue, WA (US); Todd R. Malsbary, Seattle, WA (US); Mark E. Phillips, Seattle, WA (US)

(73) Assignee: Media IP, LLC, Seattle, WA (US)

(*) Notice: Subject to any disclaimer, the term of this patent is extended or adjusted under 35 U.S.C. 154(b) by 263 days.

(21) Appl. No.: 12/906,941

(22) Filed: Oct. 18, 2010

(65) Prior Publication Data

US 2011/0197131 A1 Aug. 11, 2011

Related U.S. Application Data

(60) Provisional application No. 61/253,792, filed on Oct. 21, 2009.

(51) Int. Cl.
G06F 3/048 (2013.01)
G11B 27/34 (2006.01)
G11B 27/10 (2006.01)

(52) U.S. Cl.
CPC ............ G11B 27/34 (2013.01); G11B 27/105 (2013.01)

(58) Field of Classification Search
CPC ........ G06F 3/048; G11B 27/34; G11B 27/105
USPC ...................................................... 715/719
See application file for complete search history.

(56) References Cited

U.S. PATENT DOCUMENTS

| | | | |
|---|---|---|---|
| 6,223,292 B1 | 4/2001 | Dean et al. | |
| 6,697,944 B1 | 2/2004 | Jones et al. | |
| 6,859,791 B1 | 2/2005 | Spagna et al. | |
| 7,124,938 B1 | 10/2006 | Marsh | |
| 7,360,088 B2 | 4/2008 | Mishina et al. | |
| 7,505,584 B2 | 3/2009 | Kamibayashi et al. | |
| 7,779,064 B2 | 8/2010 | Phillips | |
| 7,809,888 B1 | 10/2010 | Clark et al. | |
| 7,844,831 B2 | 11/2010 | Benhammou et al. | |
| RE42,019 E | 12/2010 | Tagawa et al. | |
| 8,306,918 B2 | 11/2012 | Farrugia | |
| 8,312,294 B2 | 11/2012 | Sato et al. | |
| 8,571,209 B2 | 10/2013 | Bellwood et al. | |
| 2002/0126841 A1 | 9/2002 | Arai | |
| 2003/0220835 A1 | 11/2003 | Barnes, Jr. | |
| 2004/0006690 A1 | 1/2004 | Du | |
| 2004/0010601 A1 | 1/2004 | Afergan et al. | |
| 2004/0254940 A1 | 12/2004 | Brush | |

(Continued)

OTHER PUBLICATIONS

Young; International Search Report for PCT/US07/22007; mailed May 5, 2008; 1 page.

(Continued)

*Primary Examiner* — William Bashore
*Assistant Examiner* — Jeanette J Parker
(74) *Attorney, Agent, or Firm* — Ellen M. Bierman; Lowe Graham Jones PLLC

(57) ABSTRACT

A system and a method are disclosed for on-screen display that indicates to the user the current point in the playback of the video within the context of the chapter delineations. The user can access a chapter selection feature that presents a preview image from each chapter along with a timeline representing the video, and an indication on the timeline of where the chapters fall along the timeline. Alternatively, short video segments replace the still images as representing the chapters for some or all of the chapters. The user can select a chapter in which to resume playing the video by selecting one of the images or video segments.

20 Claims, 8 Drawing Sheets

(56) References Cited

U.S. PATENT DOCUMENTS

| | | |
|---|---|---|
| 2005/0025465 A1 | 2/2005 | Danieli |
| 2005/0044280 A1 | 2/2005 | Reisman |
| 2005/0120216 A1 | 6/2005 | Lee et al. |
| 2005/0130586 A1 | 6/2005 | Gnuschke et al. |
| 2005/0190782 A1 | 9/2005 | Buckley et al. |
| 2006/0156355 A1 | 7/2006 | Kawasaki et al. |
| 2006/0200415 A1 | 9/2006 | Lu |
| 2006/0224519 A1 | 10/2006 | Ahn |
| 2006/0239650 A1 | 10/2006 | Heredia et al. |
| 2007/0016956 A1 | 1/2007 | Bellwood et al. |
| 2007/0033344 A1 | 2/2007 | Tanaka |
| 2007/0043667 A1 | 2/2007 | Qawami et al. |
| 2007/0192634 A1 | 8/2007 | Cheon |
| 2007/0219921 A1 | 9/2007 | Lee |
| 2007/0234341 A1 | 10/2007 | Chang et al. |
| 2008/0005802 A1 | 1/2008 | Fierstein et al. |
| 2008/0060084 A1 | 3/2008 | Gappa et al. |
| 2008/0075437 A1 | 3/2008 | Hamada et al. |
| 2008/0098239 A1 | 4/2008 | Wada et al. |
| 2008/0133546 A1 | 6/2008 | Phillips |
| 2008/0176540 A1 | 7/2008 | Khedouri et al. |
| 2008/0205291 A1 | 8/2008 | Li et al. |
| 2008/0228300 A1 | 9/2008 | Tagawa et al. |
| 2008/0270796 A1 | 10/2008 | Suu et al. |
| 2008/0271154 A1 | 10/2008 | Kamada et al. |
| 2009/0086978 A1 | 4/2009 | McAvoy et al. |
| 2009/0150487 A1 | 6/2009 | Wolfish et al. |
| 2009/0164709 A1 | 6/2009 | Lee et al. |
| 2009/0282454 A1* | 11/2009 | Ekstrand ................. 725/134 |
| 2009/0313432 A1 | 12/2009 | Spence et al. |
| 2009/0327125 A1 | 12/2009 | Jain |
| 2010/0127013 A1 | 5/2010 | Butler |
| 2010/0212016 A1 | 8/2010 | Dubhashi et al. |
| 2010/0262912 A1* | 10/2010 | Cha ............................. 715/719 |
| 2010/0280953 A1 | 11/2010 | Kitazato |
| 2010/0287609 A1 | 11/2010 | Gonzalez et al. |
| 2010/0293581 A1 | 11/2010 | Robert |
| 2010/0297933 A1 | 11/2010 | Sim |
| 2011/0009051 A1 | 1/2011 | Khedouri et al. |
| 2011/0078722 A1 | 3/2011 | Wendling |
| 2011/0091187 A1 | 4/2011 | Duffin et al. |
| 2011/0093622 A1 | 4/2011 | Hahn et al. |
| 2011/0110516 A1 | 5/2011 | Satoh |
| 2011/0119504 A1 | 5/2011 | Nishimura |
| 2011/0225417 A1 | 9/2011 | Maharajh et al. |
| 2011/0289137 A1 | 11/2011 | Ittah et al. |
| 2012/0072713 A1 | 3/2012 | Begum et al. |
| 2012/0124390 A1 | 5/2012 | Zipperer et al. |
| 2012/0137135 A1 | 5/2012 | Kasahara et al. |
| 2012/0254629 A1 | 10/2012 | Zipperer et al. |
| 2012/0272065 A1 | 10/2012 | Matsukawa et al. |
| 2012/0315019 A1 | 12/2012 | Zipperer et al. |
| 2012/0324244 A1 | 12/2012 | Zipperer et al. |

OTHER PUBLICATIONS

Android Developers Guide, Android Software Developers Kit (SDK), Android Version 1.543, Nov. 13, 2009, pp. 1-24. Available online at >netmite.com/android/mydroid/1.6/out/target/common/docs/offline-sdk/offline.html<.

Guofei, et al. "PLI: A New Framework to Protect Digital Content for P2P Networks," Year 2003; Microsoft Research Asia, Beijing 100080, China; pp. 1-12.

\* cited by examiner

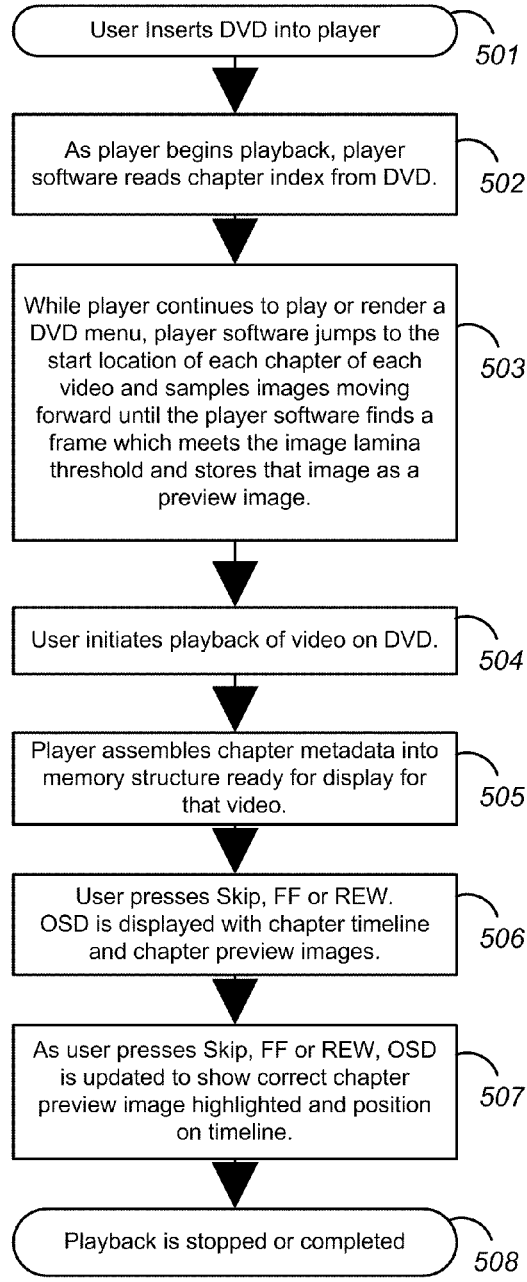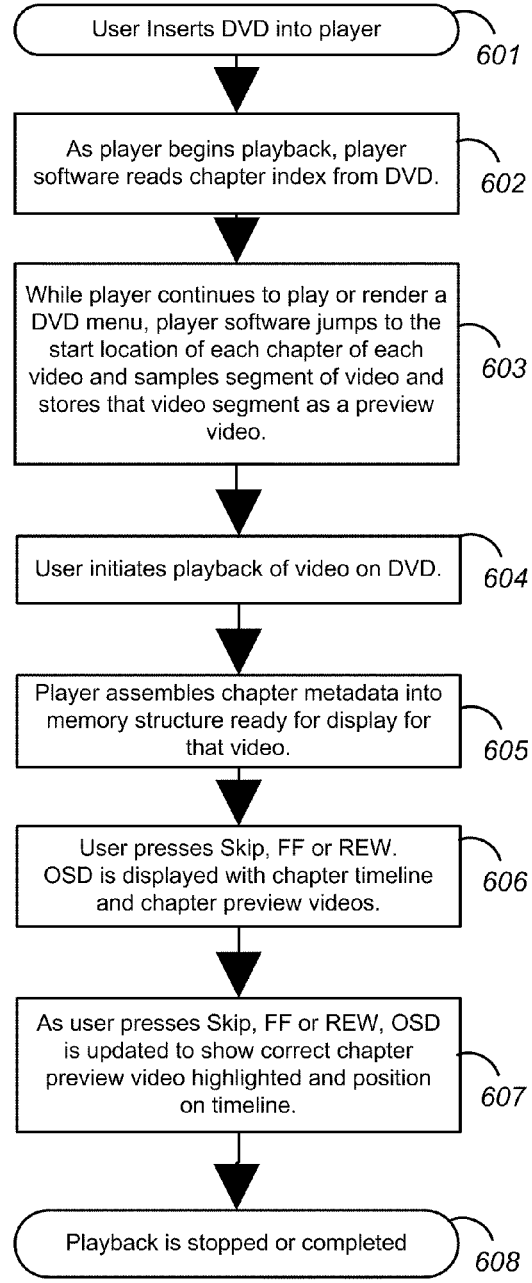
FIG. 5　　　　FIG. 6

CONTEXTUAL CHAPTER NAVIGATION

CROSS REFERENCE TO RELATED APPLICATIONS

This application claims the benefit of U.S. Provisional Application No. 61/253,792, filed Oct. 21, 2009, titled "Contextual Chapter Navigation," the contents of which is incorporated by reference in its entirety.

BACKGROUND

1. Field of Art

The disclosure generally relates to the field of navigating the playback of digital content.

2. Description of Art

Many full-length DVDs storing playable content organize the content into discrete chapters to improve a user's ability to navigate to desired content. An interface of most DVD players allows a user to navigate to a selected chapter, for example by selecting a preview image or a chapter title from a DVD menu, in order to begin viewing the DVD content from that chapter. Further, modern DVD players commonly have a chapter skip feature that when selected by the user while the DVD is playing, for example by depressing a corresponding button on the DVD player remote control, causes the playback of the DVD to skip forward to the next chapter delineation in the DVD content. Similarly, depressing a backward chapter skip button on the DVD player remote control causes the playback of the DVD to skip backward to the previous chapter delineation in the DVD content.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5 illustrates an example method of displaying still image previews from a DVD, in accordance with an embodiment.

FIG. 6 illustrates an example method of displaying video image previews from a DVD, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview and System Architecture

One embodiment of a disclosed system, method and computer readable storage medium includes an on-screen display that indicates to the user the current point in the playback of the video within the context of the chapter delineations. In one implementation, during a playback (e.g., play) of content from, for example, a secure digital (SD) card, the user can access a chapter selection feature that presents a preview image from each chapter of a video along with a timeline representing the video, and an indication on the timeline of where the chapters fall along the timeline. This provides an improved, intuitive navigation by the user among the chapters of a video. It is noted that the playback can continue on screen while the chapter selection feature displays in a foreground. It is noted that the structural characteristics of the SD card (e.g., form factor, pin connections) are defined through the SD Card Association In one embodiment, the user's current position in the playback may also be shown on the timeline. This provides a further point of reference to visually orient the user to the relative position of the chapters in the video.

In another embodiment, video previews replace the preview images as representing each chapter. A video preview comprises a video sequence of predetermined time period (e.g., anywhere from 1 second to the length of the chapter) from a corresponding chapter. In one embodiment, each chapter may include a video preview that plays within a frame (e.g., a defined small frame border such as a box or circle). In another embodiment, still images from chapters are shown and a video preview is activated when a pointer or a selection box is placed on the still image representing the chapter. The user can select a chapter in which to resume playing the video by selecting one of the video previews.

Figure 1A:
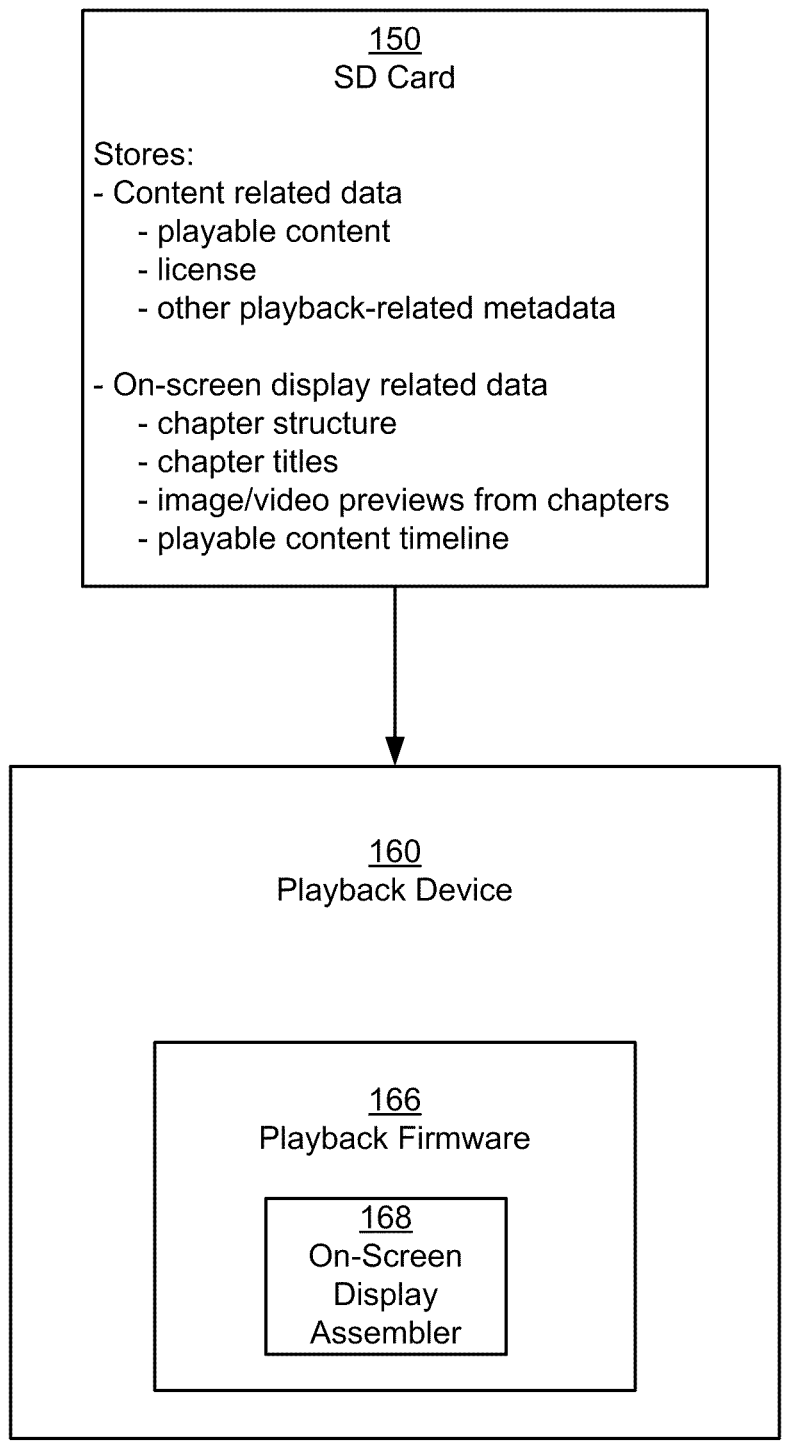
FIG. 1A is an example system architecture for navigating a contextual chapter selection, in accordance with an embodiment.

FIG. 1A is an example system architecture 1000 for navigating a contextual chapter selection, in accordance with an embodiment. The example system architecture 1000 includes an SD card 150, as an example of a media storage device, and a playback device 160. In one embodiment, the SD card 150 is a flash memory device having flash memory storage and corresponding controller for use with access to the flash memory and its contents.

The media storage device 150 may be structured in two components. A first component corresponds to content related data. The content related data includes the playable content (e.g., movie itself, for example as an MPEG-4 media file) and the corresponding files such as a license file, and any playback related metadata such as language selection, close captioning or subtitles. A second component corresponds to on-screen display related data. The on-screen display can be presented as an overlay on the playable content, as will be shown and described with reference to FIGS. 2A-4. The on-screen display related data can include the chapter structure for the playable content, the chapter titles and any accompanying text, and the preview images (including still or moving images within the frames), along with the timeline of the playable content.

The playback device 160 receives the SD card into an SD card slot. Playback firmware 166 can read the data from the SD card and can cause the playback device 160 to play the playable content in accordance with the associated license terms stored on the SD card 150. The playback firmware 166 also includes an on-screen display assembler 168 that assembles the chapter structure, the chapter titles, the image/video previews, and the playable content timeline into an on-screen display that will be shown and described with reference to FIGS. 2A-3B. It is noted that the playback firmware 166 includes a playback application to play back the contents of the SD card. However, in alternate embodiments, the playback application can be separately added to a system that does not have firmware with the playback application integrated. For ease of discussion reference herein is made to playback firmware 166 having a playback application, but it should be understood that the principles described herein would apply to a playback application that may be added to a playback firmware initially lacking an integrated playback application.

In one embodiment, during playback of the playable content, the playback device 160 determines if an instruction has been triggered corresponding to the on-screen display, e.g., a selection on a remote control for chapter information sends an interrupt signal to the playback device 160 that is translated to recall the on-screen display. Depending on a configuration selection, the playback is either paused or continued while the on-screen display overlays on top of the playback and includes timeline and/or chapter interfaces as shown and described in FIGS. 2A-3B. For configurations that have preview images from the chapters, the on-screen display assembler retrieves preview image files from the SD card 150. For those configurations having video previews, the on-screen display assembler 168 retrieves the video preview files (e.g., an .avi or animated gif file) from the SD card 150.

Figure 1B:
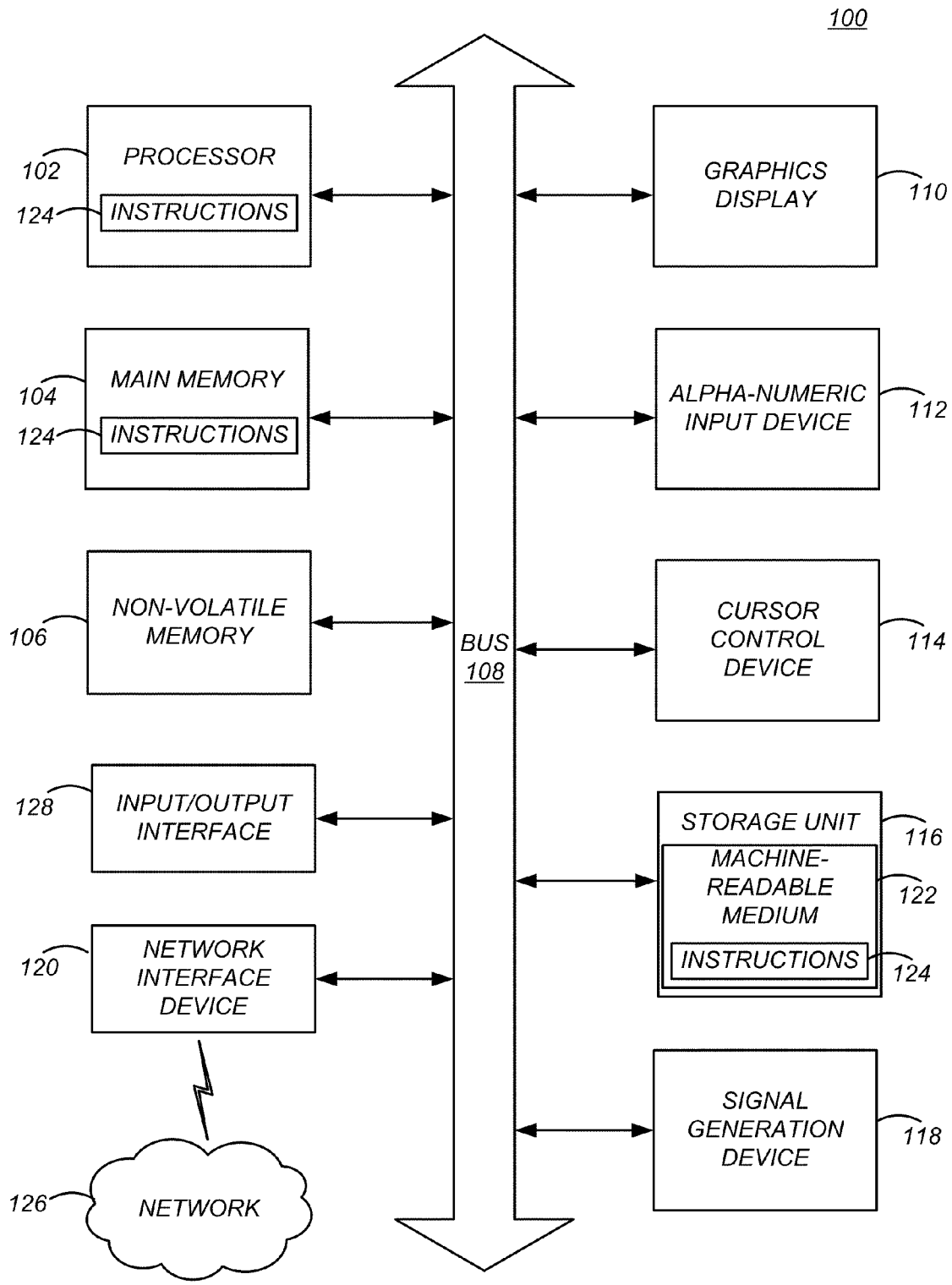
FIG. 1B illustrates one embodiment of components of an example machine able to read instructions from a machine-readable medium and execute them in a processor (or controller), for example as a device capable of playing back content stored on a flash memory card.

FIG. 1B is a block diagram illustrating components of an example machine, for use for example as a playback device 160, able to read instructions from a machine-readable medium and execute them in a processor (or controller). Specifically, FIG. 1B shows a diagrammatic representation of a machine in the example form of a playback computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computer or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example playback computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a non-volatile memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The playback computer system 100 may also include an alpha-numeric or button structural components 112 (e.g., for a keyboard or keypad), a cursor control structural components 114 (e.g., for a mouse, a trackball, a joystick, a motion sensor, a remote control, or other pointing instrument), a storage unit 116, a signal generation structural components 118 (e.g., for a speaker), an input/output (I/O) interface 128 and a network interface device 820, which also are configured to communicate via the bus 108. It is noted that the I/O interface 128 includes a structure to interface with a flash media storage device. For example, the I/O interface 128 may include a universal serial bus (USB) interface to couple (physically and/or communicatively) with a USB configured flash memory drive. Alternately, or in addition, the I/O interface 128 may include an SD reader to communicatively couple with an SD card.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Playback Navigation

In one embodiment, a user may play a movie stored on an SD card through the playback computer system 100. The movie stored on the SD card includes metadata. The metadata includes data corresponding to menu items corresponding to the movie (e.g., play, set up, special features, and chapter navigation). As the user selects to play the movie (e.g., through selection of play among the menu, the user may seek to find what is in subsequent chapters or what was in prior chapters. Moreover, the user may seek to have control over whether to continue to watch the movie or pause, while a timeline and/or chapter details are available in the foreground.

Figure 2A:
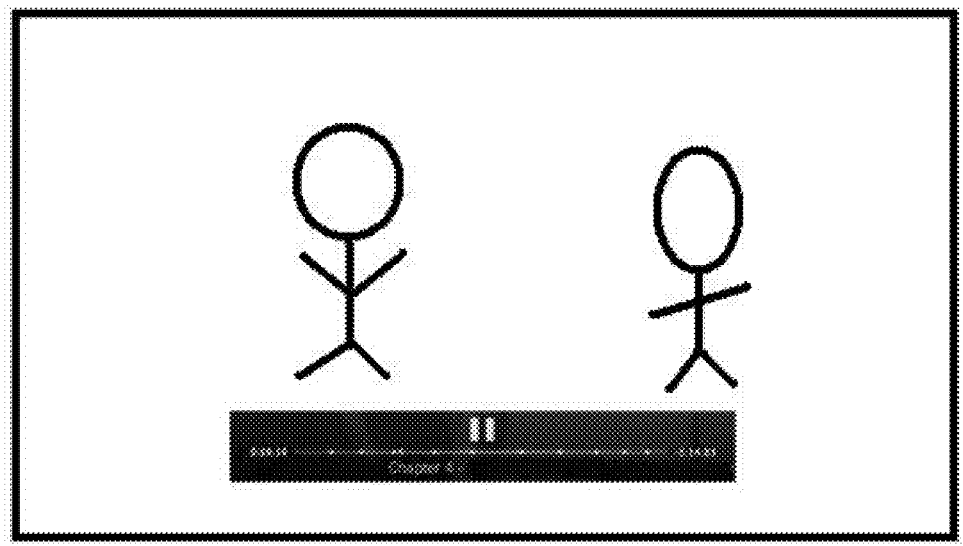
FIG. 2A illustrates an example screen image illustrating a user interface for navigating within the playback of a video, in accordance with an embodiment.
Figure 2B:
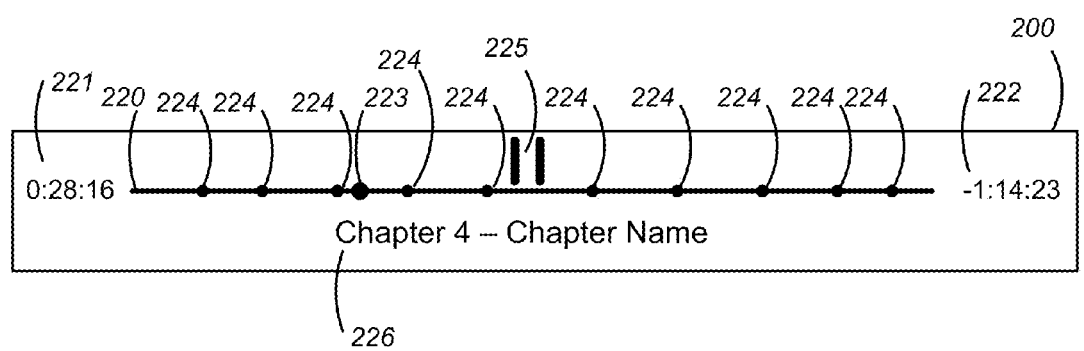
FIG. 2B illustrates the chapter timeline of the example screen image of FIG. 2A.

FIG. 2A illustrates an example screen image illustrating a user interface for navigating within the playback of a video, in accordance with one embodiment. In this example, when a user presses a playback control during playback of the video, e.g., pause, fast forward, rewind, chapter skip, etc., an on-screen display 200 is presented to the user. FIG. 2B illustrates a blown up version of the on-screen display 200 of FIG. 2A. The on-screen display includes an indication of or symbol representing the status 225 of the playback. In this example, the video has been paused. The on-screen display also includes a timeline 220. The elapsed time 221 from the beginning of the video is shown to the left of the timeline 220 and the time remaining 222 until the end of the video is shown to the right of the timeline 220. These numbers 221 and 222 are updated as the current position in the video playback is altered. The timeline 220 also includes demarcations of the beginning of chapters 224 of the video spaced proportionately along the timeline 220 to correspond to the times the chapters 224 begin. In one embodiment, the timeline also includes a marker 223 to indicate the current position within the video playback. As a user presses playback controls, e.g., fast forward, rewind, chapter skip, etc., the marker 223 indicating the current position within the video playback moves accordingly. In one implementation, the chapter title 226 corresponding to the current position within the video playback is also displayed. As the user presses playback controls that cause the current position within the video playback to move between chapters, the chapter title 226 updates accordingly.

Figure 3A:
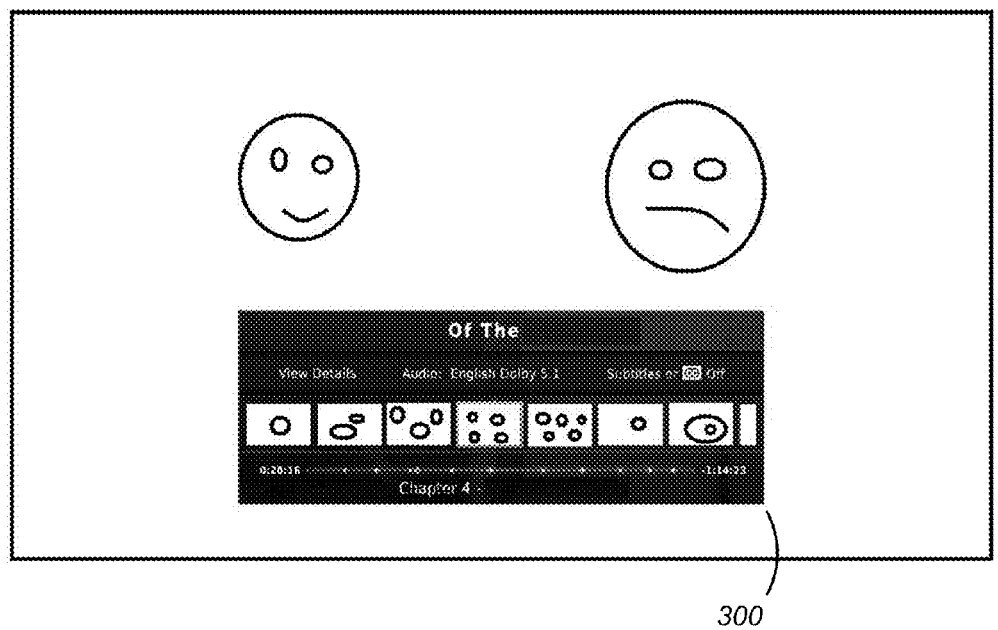
FIG. 3A illustrates an example screen image of a user interface for navigating a contextual chapter selection, in accordance with an embodiment.

FIG. 3A illustrates an example screen image of a user interface for navigating a contextual chapter selection, in accordance with one embodiment. In this example, when a user presses a playback control, for example a chapter skip button, the on-screen display 300 is presented to the user. Similar to the example shown in FIGS. 2A and 2B, the on-screen display 300 includes a chapter timeline 200 having demarcations of the beginnings of chapters 224, and a marker 223 to indicate the current position within the video playback. Also similar to the example of FIGS. 2A and 2B, the elapsed time 221 from the beginning of the video is shown to the left of the timeline 220 and the time remaining 222 until the end of the video is shown to the right of the timeline 220. The title of the current chapter 226 can be displayed below the timeline 220.

Figure 3B:
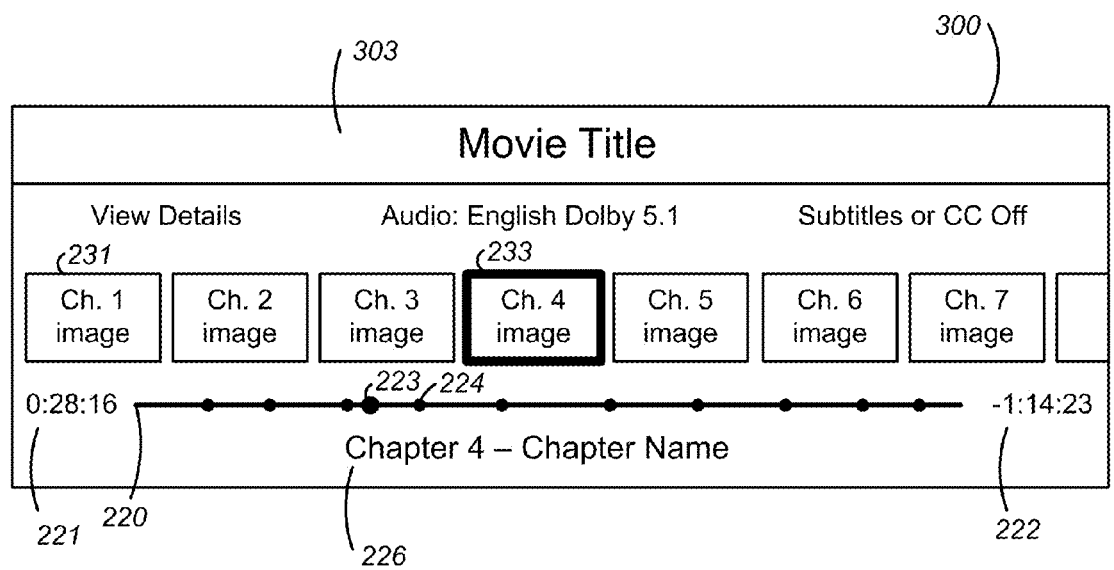
FIG. 3B illustrates the chapter timeline and chapter images of the example screen image of FIG. 3A.

FIG. 3B illustrates an enlarged version of the on-screen display 300 showing the chapter timeline 220 and chapter images 231, of the example screen image of FIG. 3A. In one embodiment, an image from each chapter represents that chapter in a line of chapter images that visually represents the sequence of chapters within the video in order. In one embodiment, the chapter timeline 220 and the chapter images 231 are displayed on different parts of the screen. For example, the chapter images may be across the top of the screen and the time line may be across the bottom of the screen. In one variation, the timeline and chapter images 231 are presented vertically within the on-screen display, rather than horizontally as shown in FIG. 3B. Whether displayed vertically or horizontally, the line of chapter images 231 operates as a visual queue for the user, to assist in navigating to the playback of particular video portions. In some cases, a chapter image 231 is from an opening sequence of the chapter, whereas in other cases, the chapter image 231 is from a distinctive, memorable, or representative scene from the content of the chapter. An outline frame 233, or any other focus identifier, highlights the chapter image for the chapter corresponding to the current position within the video playback. In one implementation, the outline frame 233 remains in the middle of on-screen display 300, and the chapter images 231 slide to the left and right behind the outline frame 233 that highlights the current chapter. For example, when a user selects to skip forward by a chapter from the current position shown in FIG. 3B, the chapter images 231 each slide one position to the left, so that the chapter 5 image is behind the outline frame 233, the chapter 4 image is immediately to the left of the frame, and so forth. Concurrently, in one embodiment, the current position marker 223 skips forward (i.e., to the right) to the next beginning of chapter demarcation 224 along the timeline 220, in this case, representing chapter 5.

In one embodiment, the on-screen display 300 can be accessed by the user while the video continues to play in the background. As time elapses in the video playback, elements 221, 222, 223, and the chapter image within frame 233 update accordingly. In another embodiment, accessing the on-screen display 300 automatically pauses the playback of the video while the user makes a selection to navigate between chapters. In one implementation, when a chapter skip button is pushed the first time, the on-screen display 300 is presented and the playback is instantly skipped to the next chapter. In another implementation, when the chapter skip button is pushed, the on-screen display 300 is presented, but the playback is only skipped based on subsequent presses of the chapter skip button. In another variation, subsequent presses of the chapter skip button after the on-screen display is presented causes the chapter images 231 to slide to the left or right so that a new chapter image appears within the frame 233, but the current location marker 233 does not change position until the user confirms the selection, for example by pressing "enter." Then, the playback jumps to the beginning of the chapter represented by the chapter image within the frame 233, and the on-screen display 300 closes. In one embodiment, the on-screen display closes after a preconfigured wait time, for example 5 to 10 seconds, although shorter or longer times can also be used.

In another embodiment, the chapter images 231 that represent each chapter are replaced by a sequence of images from the chapter, for example, a short video segment. Each of the short video segments can contain a few seconds of video from a corresponding chapter, for example 5 to 10 seconds in length. Shorter or longer segments can also be used. The video segment can be from the beginning of the chapter or from a segment within the chapter, for example, a distinctive, memorable, or representative segment from the content of the chapter.

In another embodiment, only some of the chapter images 231 that represent each chapter are replaced by a short video preview. Thus, a mix of still images and video previews can be used to visually represent the sequence of chapters in the video. In one implementation, all of the chapter images 231 are still images except for the chapter image within the frame 233 which is substituted for a video preview. Thus, for example, when a user selects to skip forward by a chapter from the current position shown in FIG. 3B, the chapter images 231 each slide one position to the left, so that the still image that used to represent chapter 5 is replaced by a video preview representing chapter 5 behind the outline frame 233, and the chapter 4 video preview is replaced by a still image from chapter 4 that appears immediately to the left of the frame 233, and so forth.

FIGS. 4-7 illustrate examples of implementations of methods of displaying chapter preview images or videos according to various embodiments adapted to be used for videos from a variety of sources. FIGS. 4-7 are merely several example implementations, and many others exist within the scope and spirit of the invention as described herein.

Figure 4:
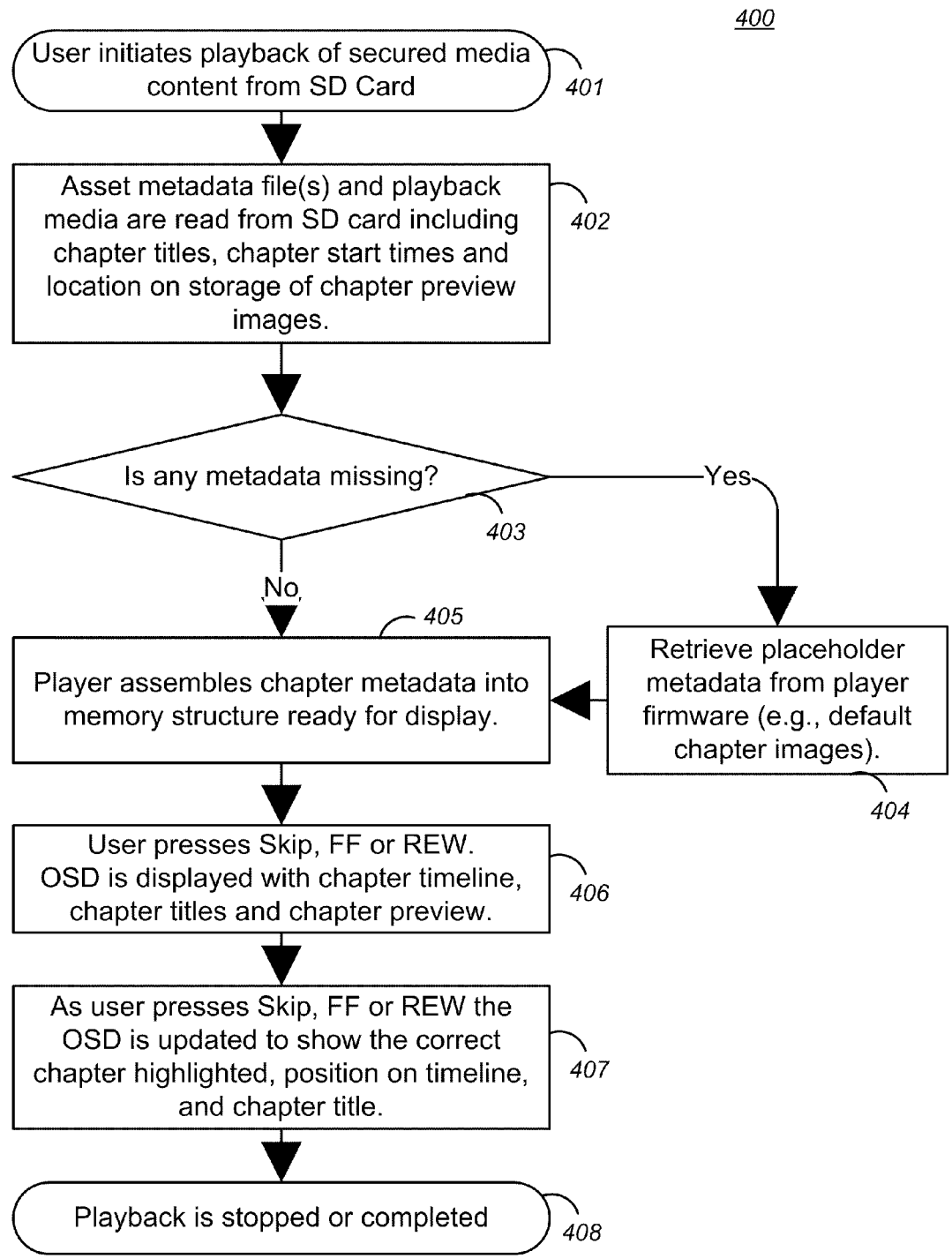
FIG. 4 illustrates an example method of displaying chapter images using GreenPlay content, in accordance with an embodiment.

FIG. 4 illustrates an example method 400 of displaying chapter images using a playback media configuration in accordance with an embodiment. The playback media configuration may include processor (or controller) readable instructions to enable playback of secured media content on a playback device 160. In step 401, the user initiates playback of secured media content from an SD card. For example, the user may insert an SD card 150 loaded with secured media content into the playback device 160. In step 402, metadata is read from files stored separately from the video file. Metadata and video files are matched using a GUI stored in the video file with same GUID contained in the metadata file structures. A video file is also referred to herein as an "asset". The metadata file includes chapter titles, chapter start times, and the location on the SD card of chapter preview images that correspond to the playable content. Then, in step 403, it is determined whether any metadata is missing from the playback metadata files. If metadata file(s) is missing, then in step 404, placeholder metadata from the playback firmware 166 is retrieved. In one example, the placeholder metadata includes default chapter images to use in place of any chapter image that is missing from the metadata in the playback media (GP.GPV) file.

In step 405, the player (in one embodiment, the on-screen display assembler 168 of the playback firmware 166 on the playback device 160) assembles the chapter metadata into a memory structure read for display. The chapter metadata may include, for example, placeholder metadata from the player firmware 166 if metadata was missing in step 403.

In step 406, the user presses a control key such as skip, fast forward, or rewind. When the control key is pressed, an on-screen display is displayed. As described with reference to FIGS. 3A and 3B, the on-screen display can include a chapter timeline, chapter titles, and chapter preview images. In step 407, as the user presses a control key such as skip, fast forward, or rewind, the on-screen display updates to show the correct chapter highlighted, the position on the timeline, and the chapter title. Thus, the user can contextually navigate between chapters of the video playback, until the method 400 concludes when the video playback is stopped or completed 408.

FIG. 5 illustrates an example method 500 of displaying still image previews from a DVD, in accordance with an embodiment. In step 501, the user inserts a DVD into a player. In step 50, as the player begins playback, the player software reads the chapter index from the DVD. In one embodiment, the chapter index includes the chapter start location on the DVD for each chapter of each video on the DVD.

Thus, in step 503, while the player continues to play or render a DVD menu, the player software jumps to the start location of each chapter of each video on the DVD and samples images moving forward until the player software finds a frame which meets the image lamina threshold and stores that image as a preview image. In one embodiment, the image lamina threshold is set so as to avoid a black or blank frame or to avoid storing an image as a preview image that is from the beginning of a sequence of images that are part of a fade-in sequence.

In step 504, the user initiates the playback of the video on the DVD, for example by pressing play. In step 505, the player assembles chapter metadata, including the chapter preview images, into a memory structure ready for display for that video. Then, in step 506, when the user presses a control such as skip, fast forward, or rewind, the on-screen display is displayed with the chapter timeline, an the chapter preview images. In step 507, as the user presses a control such as skip, fast forward, or rewind, the on-screen display is updated to show the correct chapter preview image highlighted and the position on the timeline. Thus, the user can contextually navigate between chapters of the video playback, until the method 500 concludes when the video playback is stopped or completed 508.

FIG. 6 illustrates an example method 600 of displaying video image previews from a DVD, in accordance with an embodiment. Steps 501-508 correspond to steps 601-608. However, at steps 603, 606 and 607, the method 600 diverges from the method 500 to accommodate the differences between the video image preview case as compared to the still image preview case. In step 603, while the player continues to play or render a DVD menu, the player software jumps to the start location of each chapter of each video and samples a segment of video and stores that video segment as a preview video for the corresponding chapter. Accordingly, the step 606, the on-screen display is displayed with the chapter timeline and the chapter preview videos. Then, in step 607, as the user presses a control such as skip, fast forward, or rewind, the on-screen display is updated to show the correct chapter preview video highlighted and the position on the timeline. The process can be triggered until playback is stopped or completed 608.

Figure 7:
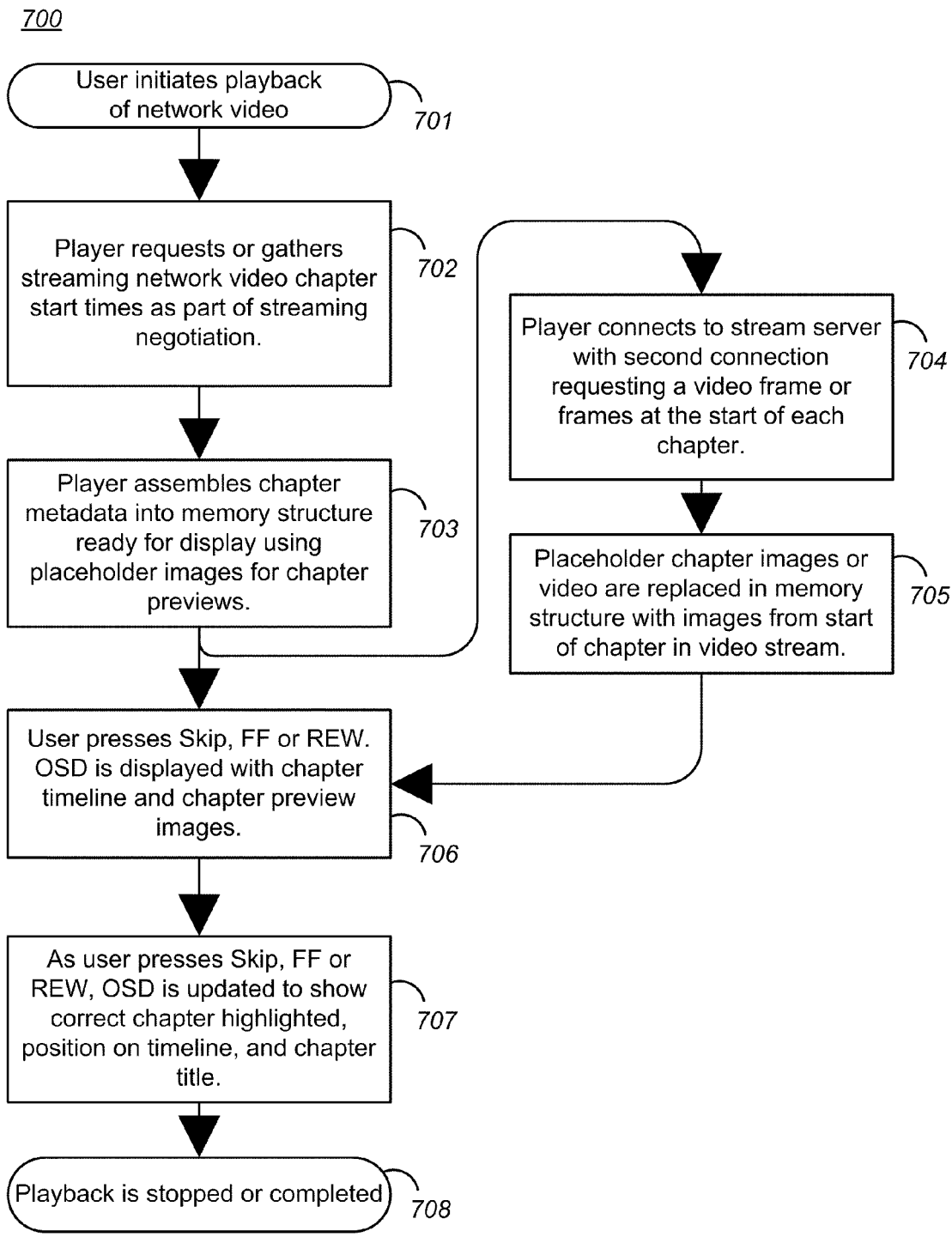
FIG. 7 illustrates an example method of displaying chapter preview images from a network video, in accordance with an embodiment.

FIG. 7 illustrates an example method 700 of displaying chapter preview images from a network video, in accordance with an embodiment. In step 701, the user initiates playback of the network video 701. In step 702, the player requests or gathers streaming network video chapter start times as part of streaming negotiation. It is noted that some existing protocols already include this transfer of chapter-related data.

In step 703, the player assembles the chapter metadata into a memory structure ready for display using placeholder images for chapter previews. The placeholder images or video for the chapter previews can be used until the actual chapter preview images or video are available. In step 704, the player connects to the stream server with a second connection requesting a video frame or frames at the start of each chapter. Then, in step 705, the placeholder chapter images or video are replaced in the memory structure with images from the start of each chapter from the video stream.

Subsequently, in step 706, when the user presses a control such as skip, fast forward, or rewind, the on-screen display is displayed with the chapter timeline and the chapter preview images or video. In step 707, as the user presses a control such as skip, fast forward, or rewind, the on-screen display is updated to show the correct chapter preview image or video highlighted, the position on the timeline, and the chapter title. Thus, the user can contextually navigate between chapters of the network video playback, until the method 700 concludes when the network video playback is stopped or completed 708.

Figure 8:
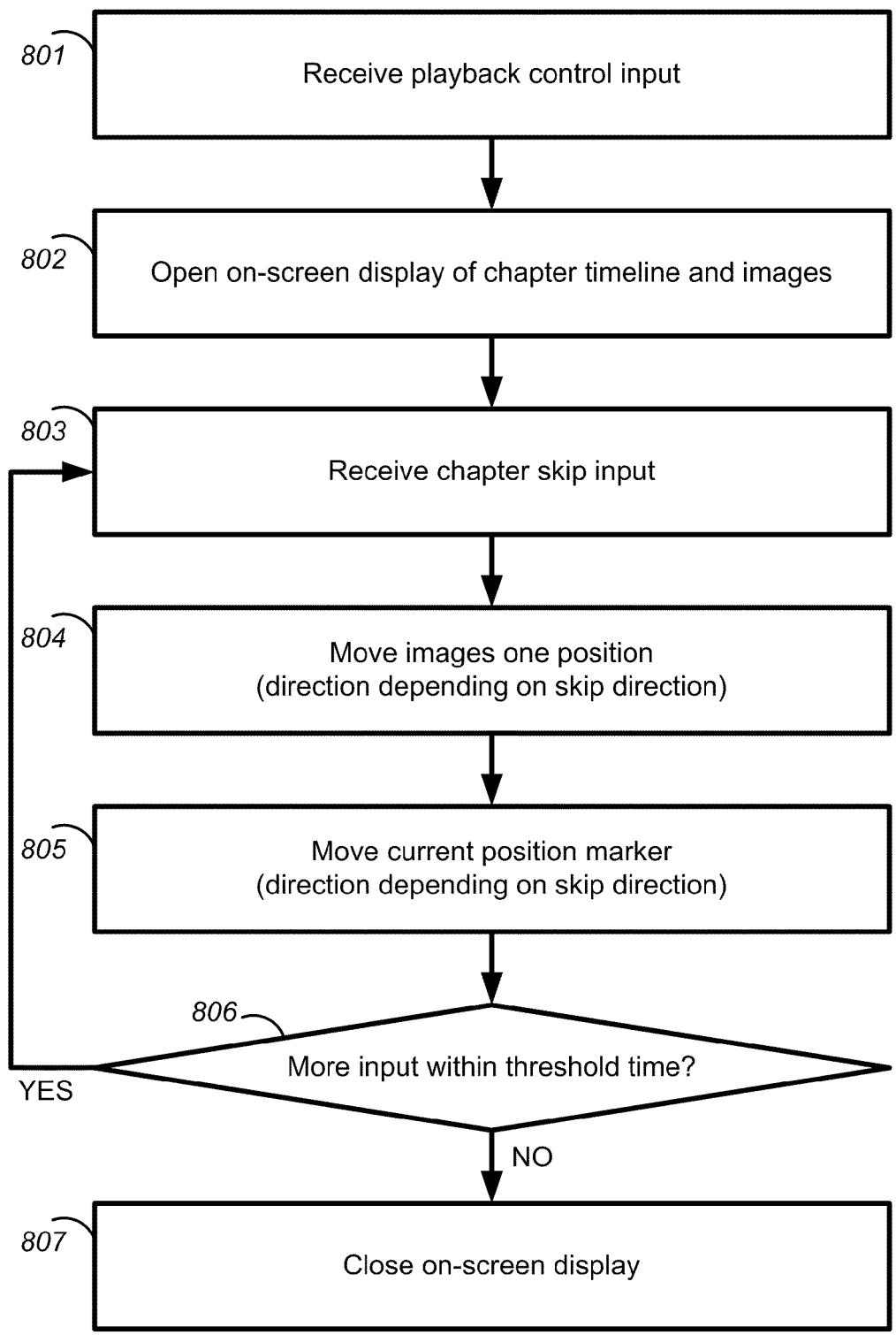
FIG. 8 an example method of navigating a contextual chapter selection, in accordance with an embodiment.

FIG. 8 an example method 800 of navigating a contextual chapter selection, in accordance with an embodiment. In step 801, a playback control input is received from the user.

For example, the user may select a button on a remote control of the playback device, such as a chapter skip button, that triggers the opening 802 of the on-screen display 300. The on-screen display 300 presents the chapter timeline 202 and the chapter images 231, video previews, or a mix of chapter images 231 and video previews, as described above. The user uses the chapter timeline 202 and the chapter images 231 to visually orient himself to where the user currently is within the playback, as shown by marker 223 compared to a desired chapter for viewing. The user can the, navigate between the chapters by selecting a chapter skip button to skip either forward or backward.

In step 803, the chapter skip input is received. The chapter skip input triggers both moving 804 the chapter images 231 and moving 805 the current position marker 223, both as described above with reference to FIGS. 3A-3B. The direction to move the chapter images 231 with respect to the frame 233 and the current position marker 223 with respect to the timeline 220 depends on whether the chapter skip direction from the received chapter skip input was forward or backward. If the chapter skip direction was forward, the chapter images 231 are moved one position to the left, and the current position marker 223 is moved to the right. If the chapter skip direction was backward, the chapter images 231 are moved one position to the right, and the current position marker 223 is moved to the left. As described above, the playback of the video is either immediately jumped to the indicated chapter, or jumped after the user confirms the chapter selection.

In step 806, it is determined whether more input is received within a threshold amount of time, for example 5 or 10 seconds. If more input is received, the method returns to step 403 in order to process further navigation of chapters within the on-screen display. If more input is not received, then the on-screen display is closed 807.

Additional Configuration Considerations

Throughout this specification, plural instances may implement components, operations, or structures described as a single instance. Although individual operations of one or more methods, e.g., in FIGS. 4-8, are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as described in FIGS. 1, 2, and 4-8. In example embodiments, one or more computer systems (e.g., a standalone, client or server computer system) or one or more modules of a computer system (e.g., processor 102 or a group of processors) may be configured by software (e.g., an application or application portion) as a module that operates to perform certain operations as described herein. The one or more processors 102 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Modules may constitute either software modules (e.g., code embodied on a machine-readable medium or in a transmission signal) or hardware modules. A hardware module is tangible unit capable of performing certain operations and may be configured or arranged in a certain manner. Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within the processor 102 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods, e.g., the methods of FIGS. 4-8, described herein may be performed, at least partially, by one or more processors 102 that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein references to "one embodiment" or "an embodiment" means that a particular element, feature, structure, or characteristic described in connection with the embodiment is included in at least one embodiment. The appearances of the phrase "in one embodiment" in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for contextual chapter navigation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for navigating a plurality of chapters of video content within a video, the method comprising:
    reading from a metadata file stored with the video chapter start times, and location on a secure digital card (SD card) of chapter preview images that correspond to the playable content as initially configured and stored on the secure digital card, each chapter comprising a segment of content of the video;
    presenting, during continuous playback of a video, an on-screen display to a user, the on-screen display including a timeline having a demarcation for the beginning of each of the plurality of chapters of the video and having a marker corresponding to a current position in the video playback, the timeline assembled from the chapter titles, the chapter start times, and the location on the secure digital card of chapter preview images that correspond to the playable content stored as part of the metadata, and the on-screen display including one image for each of the plurality of chapters from the chapter preview images displayed in sequential order parallel to the timeline, wherein a focus identifier marks an image of a chapter corresponding to the current position within the continuous video playback;
    receiving a selection of one of the chapter preview images as chapter skip input during the continuous playback of the video;
    moving the at least one image from each chapter one position along the line with respect to the focus identifier, according to the chapter skip input, wherein the one image is moved to the left when the chapter skip input indicates a skip forward and wherein the one image is moved to the right when the chapter skip input indicates a skip backward; and
    skipping playback of the video to a chapter identified by the focus identifier such that the video playback continues from the position of the chapter identified by the focus identifier.

2. The method of claim 1, wherein
    the on-screen display includes a video preview from at least one of the plurality of chapters of the video that is displayed in order in the line with the rest of the at least one images from the rest of the plurality of chapters.

3. The method of claim 1, wherein the video comprises secured media content on a flash memory device.

4. The method of claim 3, further comprising:
    initiating playback of the video from the flash memory device;
    reading metadata from the flash memory device;
    matching the read metadata from the flash memory device with the video; and
    assembling the video and the metadata in a memory structure to retrieve for playback and display.

5. The method of claim 1, wherein the metadata comprises chapter titles, chapter start times and location on the flash memory device.

6. The method of claim 1 wherein the timeline and the one image from each of the plurality of chapters displayed in order in a line are displayed vertically.

7. The method of claim 1 wherein the timeline and the one image from each of the plurality of chapters displayed in order in a line are displayed as an overlay in the foreground during the continuous playback of the video.

8. A non-transitory computer readable medium storing instructions thereon, the instructions when executed causing at least one processor to:
    read from a metadata file associated with and stored with a video chapter titles, chapter start times, and location on a secure digital card (SD card) of chapter preview images that correspond to the playable content as initially configured and stored on the secure digital card, each chapter comprising a segment of content of the video;
    present, during continuous playback of a video, an on-screen display to a user, the on-screen display including a timeline having a demarcation for the beginning of each of the plurality of chapter of the video and having a marker corresponding to a current position in the video playback, the timeline assembled from the chapter titles, the chapter start times, and the location on the SD card of chapter preview images that correspond to the playable content stored as part of the metadata, and the on-screen display including one image for each of the plurality of chapters from the chapter preview images displayed in sequential order parallel to the timeline, wherein a focus identifier marks an image of a chapter corresponding to the current position within the continuous video playback;

receive a selection of one of the chapter preview images as chapter skip input during the continuous playback of the video;

move the at least one image from each chapter one position along the line with respect to the focus identifier, according to the chapter skip input, wherein the one image is moved to the left when the chapter skip input indicates a skip forward and wherein the one image is moved to the right when the chapter skip input indicates a skip backward; and skipping playback of the video to a chapter identified by the focus identifier such that the video playback continues from the position of the chapter identified by the focus identifier.

9. The computer readable computer medium of claim 8, wherein the on-screen display includes a video preview from at least one of the plurality of chapters of the video that is displayed in order in the line with the rest of the at least one images from the rest of the plurality of chapters.

10. The computer readable computer medium of claim 8, wherein the video comprises secured media content on a flash memory device.

11. The computer readable computer medium of claim 10, further comprising instructions that cause the at least one processor to:

initiate playback of the video from the flash memory device;

read metadata from the flash memory device;

match the read metadata from the flash memory device with the video; and assemble the video and the metadata in a memory structure to retrieve for playback.

12. The computer readable computer medium of claim 8, wherein the metadata comprises chapter titles, chapter start times and location on the flash memory device.

13. The computer readable medium of claim 8 wherein the timeline and the at least one image from each of the plurality of chapters displayed in order in a line are displayed vertically.

14. The computer readable medium of claim 8 wherein the timeline and the at least one image from each of the plurality of chapters displayed in order in a line are displayed as an overlay in the foreground during the continuous playback of the video.

15. An apparatus for navigating a plurality of chapters of video content within a video, the apparatus comprising:

a video screen; and a processor, the processor configured to execute:

a chapter presentation module, configured to:

read from a metadata file associated with and stored with the video chapter titles, chapter start times, and location on a secure digital card (SD card) of chapter preview images that correspond to the playable content as initially configured and stored on the secure digital card, each chapter comprising a segment of content of the video; and present, during continuous playback of a video, an on-screen display on the video screen, the on-screen display including a timeline having a demarcation for the beginning of each of the plurality of chapters of the video and having a marker corresponding to a current position in the video playback, the timeline assembled from the chapter titles, the chapter start times, and the location on the SD card of chapter preview images that correspond to the playable content stored as part of the metadata, and the on-screen display including one image for each of the plurality of chapters from the chapter preview images displayed in sequential order parallel to the timeline, wherein a focus identifier marks an image of a chapter corresponding to the current position within the continuous video playback;

a receive module configured to receive a selection of one of the chapter preview images as chapter skip input during the continuous playback of the video;

a move module configured to move the at least one image from each chapter one position along the line with respect to the focus identifier, according to the chapter skip input, wherein the one image is moved to the left when the chapter skip input indicates a skip forward and wherein the one image is moved to the right when the chapter skip input indicates a skip backward; and a resume module for skipping playback of the video to a chapter identified by the focus identifier such that the video playback continues from the position of the chapter identified by the focus identifier.

16. The apparatus of claim 15, wherein the on-screen display includes a video preview from at least one of the plurality of chapters of the video that is displayed in order in the line with the rest of the at least one images from the rest of the plurality of chapters.

17. The apparatus of claim 15, further comprising a secured digital memory device interface, the secured digital memory device interface for receiving a secured media memory device having the video.

18. The apparatus of claim 17, wherein the processor is further configured to execute:

a playback module for initiating playback of the video from the secured digital memory device;

a reading module for reading metadata from the secured digital memory device;

a match module for matching the read metadata from the secured digital memory device with the video; and an assembly module for assembling the video and the metadata in a memory structure to retrieve for playback and display.

19. The apparatus of claim 15, wherein the metadata comprises chapter titles, chapter start times and location on the flash memory device.

20. The apparatus of claim 15 wherein the timeline and the one image from each of the plurality of chapters displayed in order in a line are displayed vertically on the video screen.

* * * * *

UNITED STATES PATENT AND TRADEMARK OFFICE
CERTIFICATE OF CORRECTION

PATENT NO. : 9,595,300 B2
APPLICATION NO. : 12/906941
DATED : March 14, 2017
INVENTOR(S) : Todd E. Duffin et al.

It is certified that error appears in the above-identified patent and that said Letters Patent is hereby corrected as shown below:

In the Claims

In Column 11, Line 56 (Claim 1), after "chapter" insert --titles, chapter--.

In Column 12, Line 62 (Claim 8), change "chapter" to --chapters--.

Signed and Sealed this
Ninth Day of May, 2017

Michelle K. Lee
*Director of the United States Patent and Trademark Office*